US012523827B2

(12) United States Patent
Liu et al.

(10) Patent No.: US 12,523,827 B2
(45) Date of Patent: Jan. 13, 2026

(54) PHOTONIC INTEGRATED CIRCUIT TO GLASS SUBSTRATE ALIGNMENT THROUGH DUAL CYLINDRICAL LENS

(71) Applicant: Intel Corporation, Santa Clara, CA (US)

(72) Inventors: Changhua Liu, Chandler, AZ (US); Pooya Tadayon, Portland, OR (US); John Heck, Berkeley, CA (US); Srikant Nekkanty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 17/476,120

(22) Filed: Sep. 15, 2021

(65) Prior Publication Data

US 2023/0077939 A1    Mar. 16, 2023

(51) Int. Cl.
*G02B 6/42* (2006.01)

(52) U.S. Cl.
CPC ......... *G02B 6/4214* (2013.01); *G02B 6/4244* (2013.01)

(58) Field of Classification Search
CPC .................. G02B 6/4214; G02B 6/4244
USPC ........................................................ 385/33
See application file for complete search history.

(56) References Cited

U.S. PATENT DOCUMENTS

| 6,075,913 A * | 6/2000 | Cohen | G02B 6/426 |
| | | | 385/47 |
| 7,250,317 B2 * | 7/2007 | Heideman | G02B 6/42 |
| | | | 438/31 |
| 8,985,868 B2 * | 3/2015 | Giziewicz | G02B 6/4246 |
| | | | 385/88 |
| 2003/0169979 A1 * | 9/2003 | Fujita | G02B 6/4246 |
| | | | 385/89 |
| 2005/0069253 A1 * | 3/2005 | Heideman | G02B 6/42 |
| | | | 385/31 |
| 2006/0239612 A1 * | 10/2006 | De Dobbelaere | G02B 6/42 |
| | | | 385/37 |
| 2011/0164227 A1 * | 7/2011 | Kim | H04N 9/3114 |
| | | | 353/98 |
| 2017/0207600 A1 | 7/2017 | Klamkin et al. | |
| 2018/0348455 A1 * | 12/2018 | Yasumura | G02B 6/12002 |
| 2019/0324211 A1 | 10/2019 | Israel et al. | |
| 2020/0278508 A1 | 9/2020 | Israel et al. | |

(Continued)

FOREIGN PATENT DOCUMENTS

| CN | 115808750 A | 3/2023 | |
| GB | 2381769 A | 5/2003 | |
| WO | WO-2020148979 A1 * | 7/2020 | ........... G02B 6/0016 |

OTHER PUBLICATIONS

"European Application Serial No. 22185106.6, Extended European Search Report mailed Jan. 4, 2023", 8 pgs.

(Continued)

*Primary Examiner* — Jerry M Blevins
(74) *Attorney, Agent, or Firm* — Compass IP Law PC

(57) ABSTRACT

An electronic device comprises a photonic integrated circuit (PIC) including at least one optical signal source, an emitting lens disposed on the PIC to steer light emitted by the at least one optical signal source in a direction substantially parallel to a first surface of the PIC, and an optical element disposed on the PIC and having a curved surface in a shape of a quarter cylinder that is configured to steer light emitted from the emitting lens in a direction substantially orthogonal to the first surface of the PIC.

20 Claims, 6 Drawing Sheets

(56) References Cited

U.S. PATENT DOCUMENTS

2020/0381887 A1* 12/2020 Watanabe ............. H01S 3/0621
2023/0077633 A1   3/2023 Liu et al.
2023/0152537 A1*  5/2023 Witzens ............... G02B 6/4213
                                                            385/33

OTHER PUBLICATIONS

First Office Action for U.S. Appl. No. 17/476,080, Mailed Feb. 12, 2025, 8 pages.

* cited by examiner

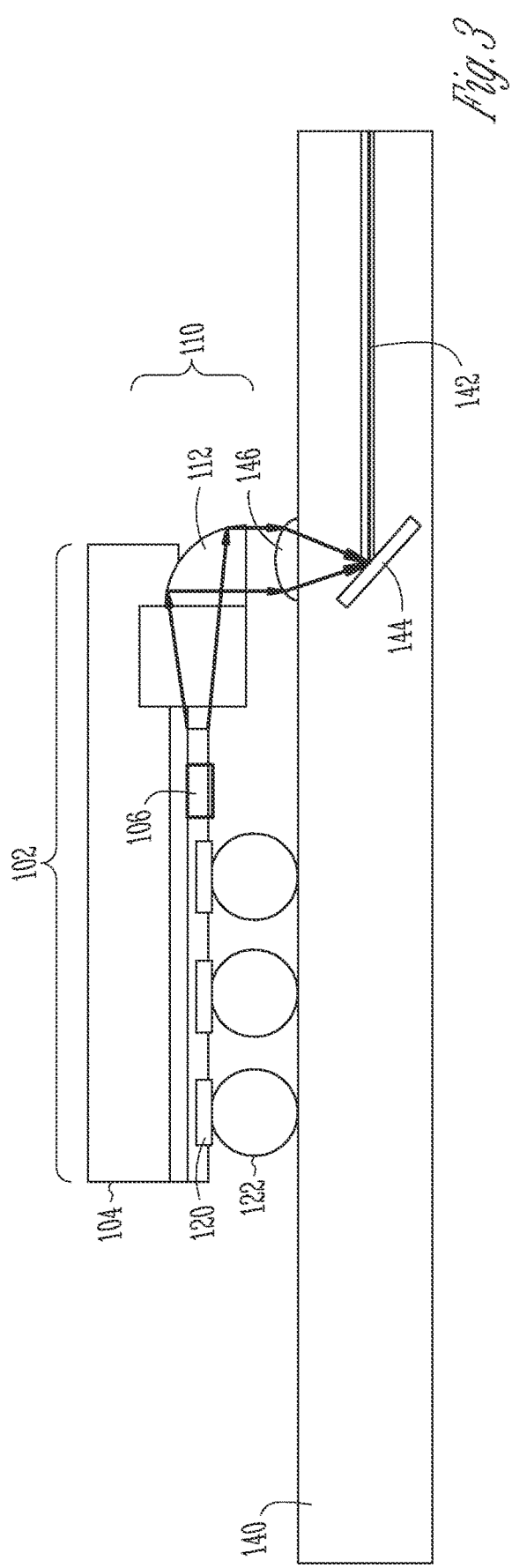
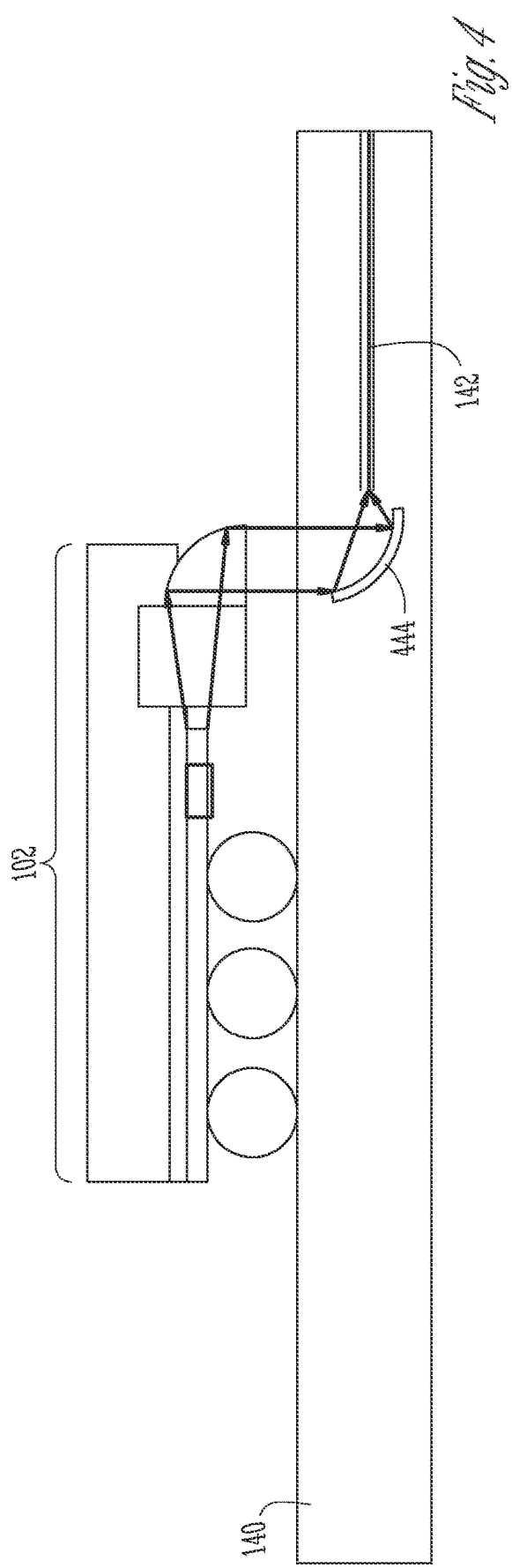

US 12,523,827 B2

PHOTONIC INTEGRATED CIRCUIT TO GLASS SUBSTRATE ALIGNMENT THROUGH DUAL CYLINDRICAL LENS

TECHNICAL FIELD

Embodiments pertain to photonic integrated circuits (PICs). Some embodiments relate to techniques to couple an optical signal from a PIC to a waveguide.

BACKGROUND

A photonic integrated circuit (PIC) can generate an optical signal. Optically coupling the optical signal to a waveguide allows the optical signal to be used in an optical interface that could be used as a high-speed interface between electronic devices. Waveguides could be fabricated in glass substrates, but there is not a well-established solution for optically coupling between the PIC and a glass substrate having a waveguide.

BRIEF DESCRIPTION OF THE DRAWINGS

FIG. 3 is illustration of an example of an electronic device mounted on a glass substrate in accordance with some embodiments;

FIG. 4 is illustration of another example of an electronic device mounted on a glass substrate in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A glass substrate could potentially be used as a waveguide medium to carry optical signals in a photonic assembly or to integrate photonics into a conventional electronic assembly. However, using glass substrates with waveguides is not widely adopted, and currently there is no well-established solution for an optical coupling between a photonic integrated circuit (PIC) and a waveguide formed using a glass substrate. An optical coupling between the PIC and the waveguide should have low signal loss. Optical signal loss can be reduced by having an optimized alignment between the PIC and the waveguide. But alignment of the optical coupling between the PIC and the waveguide shouldn't be complicated. A relatively relaxed tolerance for alignment of the optical coupling between the PIC and the waveguide may allow the alignment to be passive. This would reduce the complexity of assemblies that include photonic devices.

Figure 1:
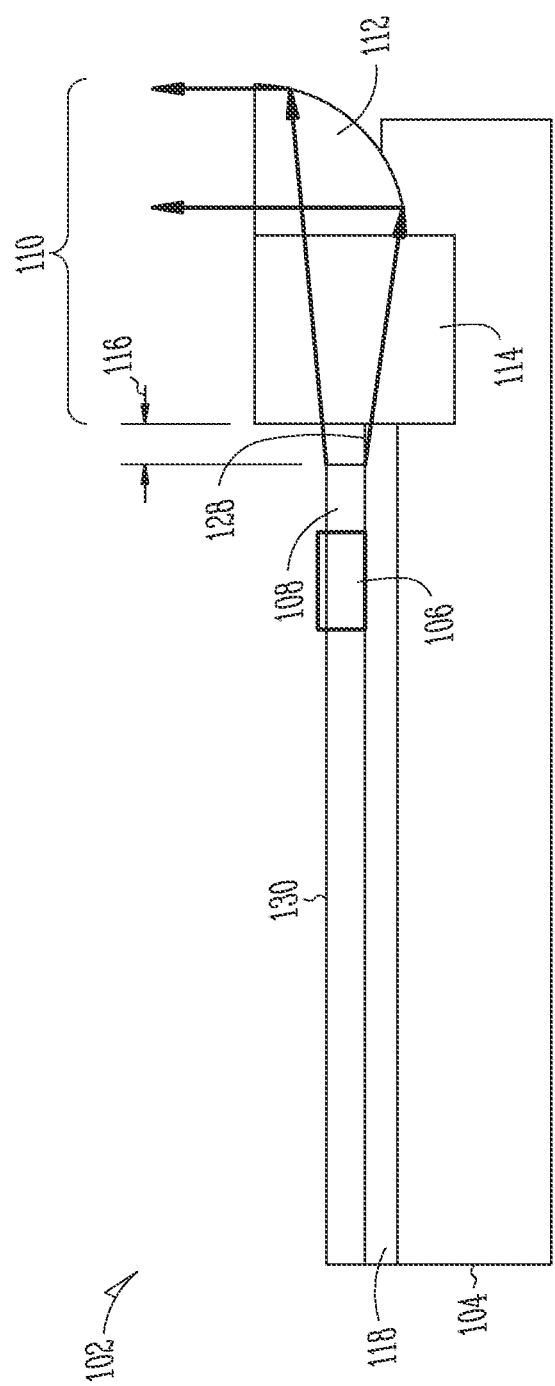
FIG. 1 is an illustration of an example of an electronic device having a photonic integrated circuit (PIC) in accordance with some embodiments.
Figure 5:
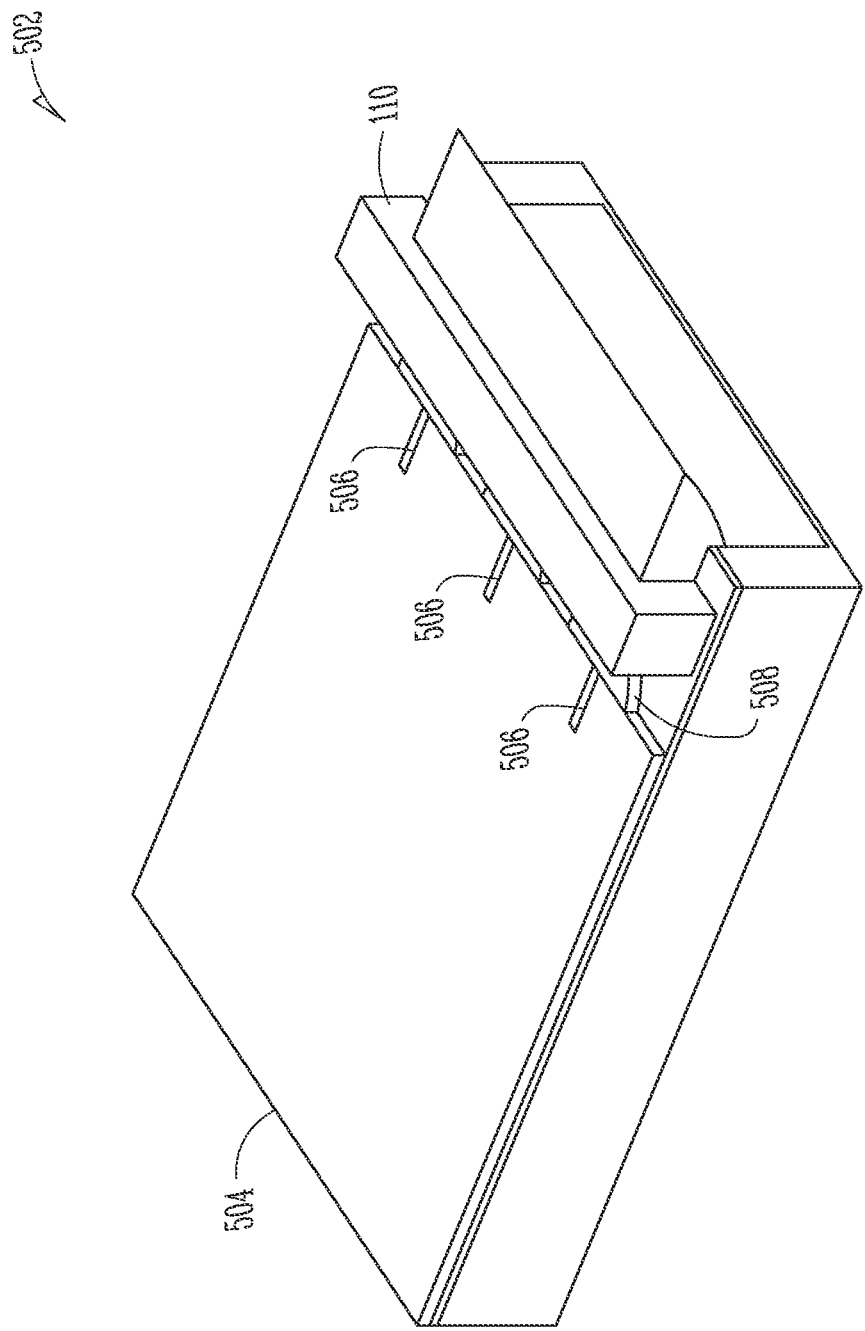
FIG. 5 is an illustration of portions of an example of an electronic device having multiple optical channels in accordance with some embodiments.

FIG. 1 is an illustration of an example of an electronic device 102 that includes a PIC 104. The PIC 104 includes at least one optical signal source 106 or other optical signal medium (e.g., a waveguide). The optical signal source 106 may be a laser diode. The electronic device 102 includes an emitting lens 108 and another optical element 110. The emitting lens 108 is shown from the side in FIG. 1. In some examples the emitting lens 108 has an arc shape. In some examples, the emitting lens 108 has an orthogonal half-cylinder shape orthogonal to the top surface of the PIC 104 as can be seen in FIG. 5. The emitting lens 108 may be fabricated with the PIC 104, or the emitting lens 108 may be added to the PIC 104 after the PIC 104 is fabricated. The emitting lens 108 is shown next to the optical signal source 106, but another waveguide may be arranged between the optical signal source 106 and the emitting lens 108.

The emitting lens 108 receives light from the optical signal source and steers the light toward the optical element 110. The arrows show that the emitting lens 108 expands the width of the optical signal from the PIC 104. The arrows also show that the light is sent substantially in a direction parallel to the top surface of the PIC 104 to the optical element 110 (e.g., within a few degrees of parallel), although the light beam is expanding.

The PIC 104 may include a buried insulator layer 118 (e.g., a buried oxide or BOX layer) at a height intermediate the top surface of the PIC 104 and the bottom surface of the PIC 104. The optical structures of the PIC 104 may be fabricated against the buried insulator layer 118. The emitting lens 108 is arranged on the PIC above the buried oxide layer 118.

The optical element 110 includes a support portion 114 and a curved portion 112. The curved portion 112 may be another lens or lens portion of the optical element. In some examples, the curved surface of the curved portion 112 includes a mirror. The optical element 110 is a collimating element that (as shown by the arrows) sends a collimated light beam vertically away from the top surface of the PIC 104 and substantially orthogonal to the top surface. Thus, the curved surface provides a one-dimensional total internal reflection (1D TIR) off-axis collimating optical element.

The support portion 114 of the optical element has a surface facing the emitting lens that is perpendicular to the top surface of the PIC 104. There may be a space 116 between the emitting lens and the optical element 110. Space 116 may be an air space. In some examples, space 116 is filled with an epoxy that has a low refractive index. The substantially perpendicular surface of the support portion 114 faces the emitting lens 108 and receives light from emitting lens 108, and the light passes through the support portion 114 to the curved surface. The optical element 110 may be fabricated as a single piece to avoid reflections at the interface between the support portion 114 and the curved portion 112. In certain embodiments, the optical element 110 is fabricated as two pieces and an anti-reflection coating is applied at the interface between the support portion 114 and the curved portion 112.

Figure 2:
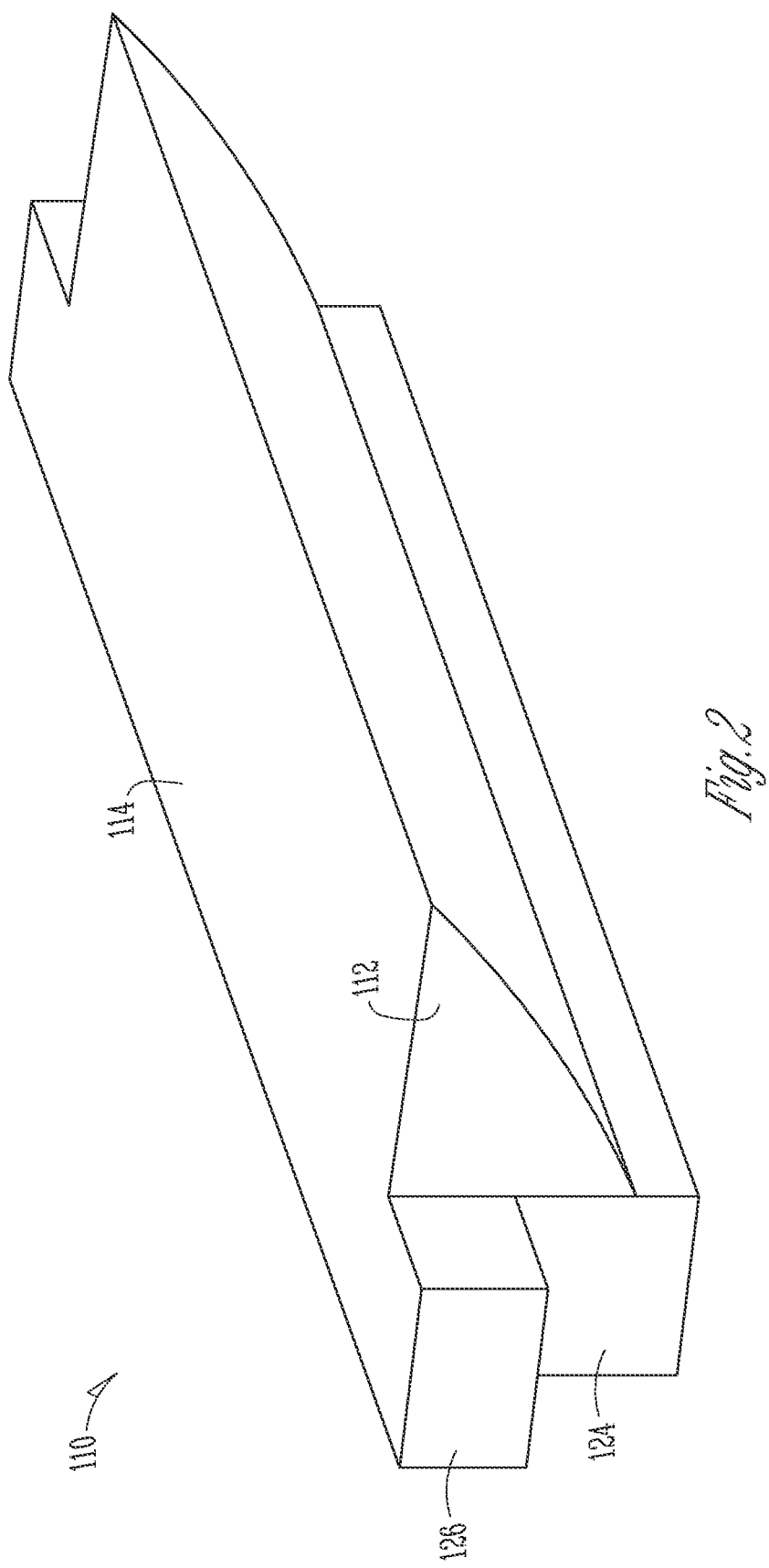
FIG. 2 is an illustration of the optical element of an electronic device in accordance with some embodiments.

FIG. 2 is an illustration of the optical element 110 of the electronic device 102 of FIG. 1. The curved portion 112 has a curved surface substantially in a shape of a quarter of a cylinder as though the cylinder was divided into quarters along its axis. In some examples, the curved surface of the curved portion 112 has a hyperbolic shape. The support portion 114 has a shape like a very wide "T." The support portion 114 includes an insertion portion 124 and a stop portion 126.

Returning to FIG. 1, the PIC 104 includes a second surface 128 lower than the top surface 130. The substrate of the PIC 104 includes a recess or cavity open from the second surface 128. The insertion portion of 124 of the optical element 110 is inserted into the recess and the stop portion 126 of the optical element 110 is supported by the second surface 128 of the substrate. The stop portion 126 rests on the substrate and the height of the resting ledge of the support portion 114 can be used to set the height of the position of the optical element 110.

The optical element 110 can be made from a material transparent to infrared. Because silicon is transparent to near infrared the optical element could include silicon. The support portion 114 could be formed using crystallographic etching of silicon. The curved portion 112 could be formed using greyscale lithography to form the curved surface followed by crystallographic etching to etch through the wafer vertically.

FIG. 3 is illustration of an example of the electronic device 102 of FIG. 1 mounted on a glass substrate 140. The PIC 104 is shown flip-chip mounted on the glass substrate 140 with the optical element 110 facing the glass substrate. The PIC 104 has bonding pads 120 that are bonded to the glass substrate using solder bumps 122 (shown as solder balls). The height of the solder bumps may be chosen to provide clearance between the optical element 110 and the glass substrate 140. Because the electronic device 102 is inverted from FIG. 1, the collimated light beam is sent vertically down toward the glass substrate 140.

The glass substrate 140 includes a waveguide 142 and another optical element to steer or focus the light received from the electronic device 102 onto the waveguide 142. The waveguide 142 may be a single mode waveguide. The waveguide 142 may then transmit the optical signals to another device in a direction parallel to the top surface of the glass substrate 140. The electronic device 102 and the glass substrate 140 form an interface to optically connect the optical signal source 106 and the waveguide 142. The optical element of the glass substrate can be a beam reduction structure to reduce the beam to the mode size of the waveguide. In FIG. 3, the optical element of the glass substrate 140 includes lens 146 to reduce the beam and a mirror 144 to steer the beam into the waveguide 142. In certain examples, the lens 146 is a gradient index (GRIN) lens.

FIG. 4 is illustration of another example of the electronic device 102 of FIG. 1 mounted on a glass substrate 140. The difference from the example of FIG. 2 is in the optical element included in the glass substrate 140. In FIG. 4, the glass substrate 140 includes a curved mirror 444 to catch the collimated beam from the electronic device 102 and focus the beam onto the waveguide 142. The mirrors 144, 444 in FIGS. 3 and 4 may be formed by etching a cavity or surface in the glass substrate 140 and forming a reflective surface on the etched structure.

In the examples of FIGS. 3 and 4, one optical signal source and waveguide pair may be an optical channel that sends optical signals. The PIC 104 may include multiple optical signal sources and the optical element 110 of the electronic device 102 may reflect and collimate multiple beams for more than one optical channel.

FIG. 5 is an illustration of portions of an example of an electronic device 502 having multiple optical channels. The example of FIG. 5 shows three optical channels, but the electronic device may have another number of optical channels (e.g., 2 channels, 4 channels, 8 channels, etc.).

The electronic device 502 includes a PIC 504, and each optical channel includes a waveguide 506 of the PIC 504. The electronic device 502 includes an emitting lens 508 for each waveguide 506. The emitting lenses 508 have an orthogonal half-cylinder shape. In some examples, the emitting lenses have the shape of a small arc of an orthogonal cylinder. The emitting lenses 508 can be created directly on the PIC 504 using a lithography etching process.

Each emitting lens steers light emitted by the corresponding optical signal source in a direction substantially parallel to the top surface of the PIC 504. The optical signals are expanded to a larger mode to relax the alignment tolerance. The electronic device includes one optical element 110 having a curved surface. The curved surface of the optical element 110 steers light from all the emitting lenses in a direction substantially orthogonal to the surface of the PIC 504 to send three collimated light beams vertically from the electronic device—one for each optical channel.

The PIC 504 is flip chip mounted on a glass substrate (not shown) and the glass substrate includes a waveguide for each optical channel (three in the example of FIG. 5) to receive one of the collimated beams from the electronic device 502. The glass substrate includes additional optical elements for each optical channel to reduce the mode of a corresponding collimated light beam to the mode of the waveguide and steer the reduced beam onto the respective waveguide. For instance, the glass substrate may include a lens 144 and mirror 146 as shown in FIG. 3 for each waveguide, or the glass substrate may include a curved mirror 444 as shown in FIG. 4 for each waveguide.

Figure 6:
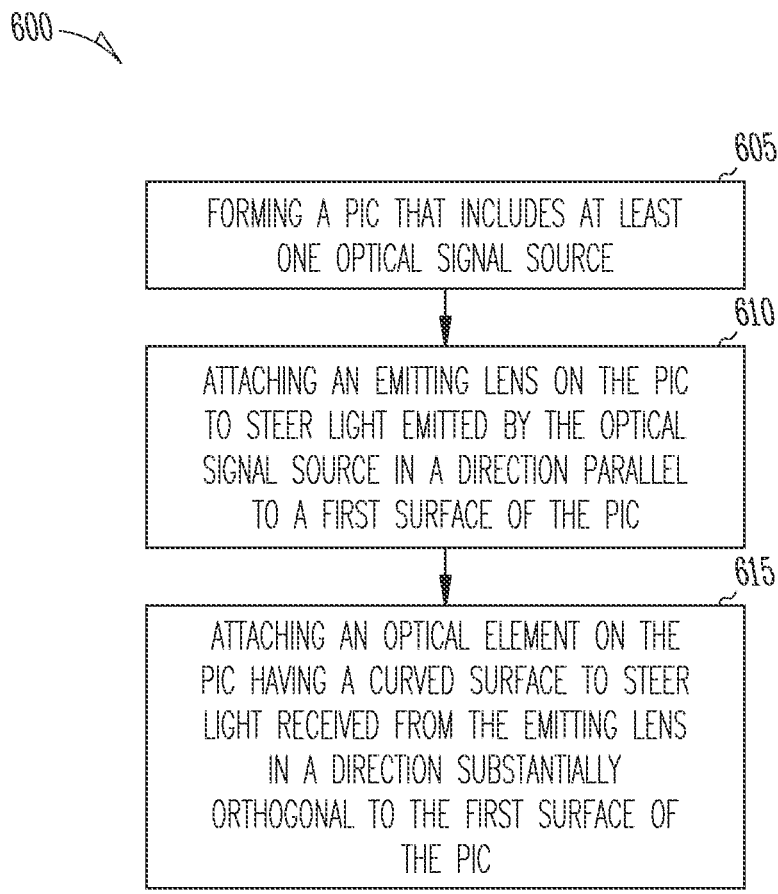
FIG. 6 is a flow diagram of a method of making an electronic device in accordance with some embodiments.

FIG. 6 is a flow diagram of a method 600 of manufacture of an electronic device. The electronic device may be any of the electronic devices of shown in FIGS. 1 and 3-5. At block 605, a PIC is formed that includes at least one optical signal source. The optical signal source may produce light in the infrared spectrum. The PIC may include a substrate portion and an active portion that includes one or both of active photonic circuit and active electronic circuits. The active portion may be formed to include multiple surfaces.

At block 610, an emitting lens is arranged on the PIC. The emitting lens may be arranged on a second surface below the top surface of the PIC. In some examples, the second surface is the surface of a buried insulator layer of the PIC. The emitting lens may be etched onto the PIC during forming of the PIC and include silicon (e.g., silicon nitride). In certain examples, the emitting lens may be separate from the PIC and attached to the PIC. The emitting lens may have a half-disk shape as shown in FIG. 5. The emitting lens is positioned to steer light emitted by the optical signal source in a direction substantially parallel to the top surface and the second surface of the PIC.

At block 615, an optical element is attached to the PIC. The optical element has a curved surface as shown in the example of FIG. 2. The curved surface steers light received from the emitting lens in a direction substantially orthogonal to the top surface of the PIC. Attaching the optical element may include forming a recess or cavity in the second surface, and positioning a support portion of the optical into the recess with the curved portion on the opposite of the support portion from the emitting lens so that light received from the emitting lens passes through the support portion to a curved portion of the optical element. The supporting portion may be fused or glued to the PIC.

The PIC with the attached optical element is mounted on a glass substrate. The PIC may include pads (e.g., bonding pads or I/O pads) on the top surface and mounting the PIC may include disposing solder bumps on the bonding pads and attaching the first surface of the PIC to a glass substrate using the solder bumps. The glass substrate includes a waveguide and another optical element to steer light onto the waveguide. The optical element of the PIC is positioned to provide a collimated light beam to the optical element of the glass substrate to steer an optical signal onto the waveguide. Some examples of the optical element of the glass substrate include the lens 144 and mirror 146 in the example of FIG. 3, and the curved mirror 444 shown in the example of FIG. 4. As described regarding FIG. 5, the PIC and glass substrate may include multiple optical signal sources and waveguides included in multiple optical channels.

The electronic device and the glass substrate may be included in an optical interface between two or more higher level devices. Because the light from the optical signal source is expanded and then refocused, the tolerance needed in the alignment is relaxed, and the aligning and assembly process of the PIC and the waveguide is simplified. An example of a higher level electronic device using assemblies with optical elements as described in the present disclosure is included to show an example of a higher level device application.

Figure 7:
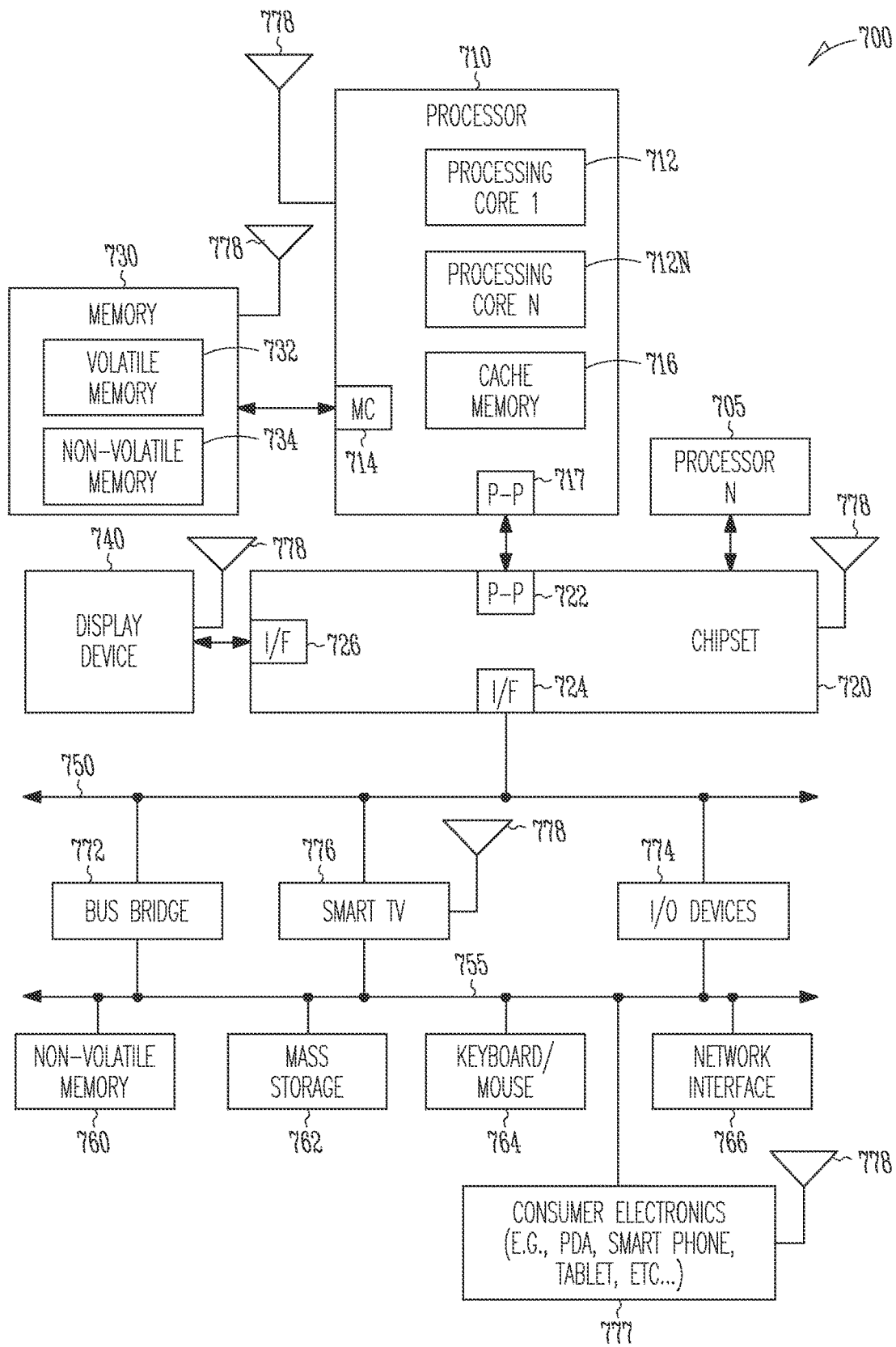
FIG. 7 illustrates a system level diagram in accordance with some embodiments.

FIG. 7 illustrates a system level diagram, according to one embodiment of the invention. For instance, FIG. 7 depicts an example of an electronic device (e.g., system) that can include one or more of the optical interfaces as described in the present disclosure. In one embodiment, system 700 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 700 is a system on a chip (SOC) system. In one example, two or more systems as shown in FIG. 7 may be coupled together using one or more glass interposers as described in the present disclosure.

In one embodiment, processor 710 has one or more processing cores 712 and 712N, where N is a positive integer and 712N represents the Nth processor core inside processor 710. In one embodiment, system 700 includes multiple processors including 710 and 705, where processor 705 has logic similar or identical to the logic of processor 710. In some embodiments, processing core 712 includes, but is not limited to, pre-fetch logic to fetch instructions, decode logic to decode the instructions, execution logic to execute instructions and the like. In some embodiments, processor 710 has a cache memory 716 to cache instructions and/or data for system 700. Cache memory 716 may be organized into a hierarchal structure including one or more levels of cache memory.

In some embodiments, processor 710 includes a memory controller 714, which is operable to perform functions that enable the processor 710 to access and communicate with memory 730 that includes a volatile memory 732 and/or a non-volatile memory 734. In some embodiments, processor 710 is coupled with memory 730 and chipset 720. Processor 710 may also be coupled to a wireless antenna 778 to communicate with any device configured to transmit and/or receive wireless signals. In one embodiment, the wireless antenna interface 778 operates in accordance with, but is not limited to, the IEEE 802.11 standard and its related family, Home Plug AV (HPAV), Ultra-Wide Band (UWB), Bluetooth, WiMax, or any form of wireless communication protocol.

In some embodiments, volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 734 includes, but is not limited to, flash memory, phase change memory (PCM), read-only memory (ROM), electrically erasable programmable read-only memory (EEPROM), or any other type of non-volatile memory device.

Memory 730 stores information and instructions to be executed by processor 710. In one embodiment, memory 730 may also store temporary variables or other intermediate information while processor 710 is executing instructions. In the illustrated embodiment, chipset 720 connects with processor 710 via Point-to-Point (PtP or P-P) interfaces 717 and 722. The interfaces 717 and 722 may include one or more optical interfaces. Chipset 720 enables processor 710 to connect to other elements in system 700. In some embodiments of the invention, interfaces 717 and 722 operate in accordance with a PtP communication protocol such as the Intel® QuickPath Interconnect (QPI) or the like. In other embodiments, a different interconnect may be used.

In some embodiments, chipset 720 is operable to communicate with processor 710, 705N, display device 740, and other devices 772, 776, 774, 760, 762, 764, 766, 777, etc. Buses 750 and 755 may be interconnected together via a bus bridge 772. Chipset 720 connects to one or more buses 750 and 755 that interconnect various elements 774, 760, 762, 764, and 766. Chipset 720 may also be coupled to a wireless antenna 778 to communicate with any device configured to transmit and/or receive wireless signals. Chipset 720 connects to display device 740 via interface (I/F) 726. Display 740 may be, for example, a liquid crystal display (LCD), a plasma display, cathode ray tube (CRT) display, or any other form of visual display device. In some embodiments of the invention, processor 710 and chipset 720 are merged into a single SOC. In one embodiment, chipset 720 couples with (e.g., via interface 724) a non-volatile memory 760, a mass storage medium 762, a keyboard/mouse 764, and a network interface 766 via I/F 724 and/or I/F 726, I/O devices 774, smart TV 776, consumer electronics 777 (e.g., PDA, Smart Phone, Tablet, etc.). One or more of interfaces 724 and 726 may be an optical interface.

In one embodiment, mass storage medium 762 includes, but is not limited to, a solid state drive, a hard disk drive, a universal serial bus flash memory drive, or any other form of computer data storage medium. In one embodiment, network interface 766 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra-Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although cache memory 716 is depicted as a separate block within processor 710, cache memory 716 (or selected aspects of 716) can be incorporated into processor core 712.

The devices, systems, and methods described can provide improved routing of interconnection between ICs for a multichip package in addition to providing improved transistor density in the IC die. Examples described herein include two or three IC dies for simplicity, but one skilled in the art would recognize upon reading this description that the examples can include more than three IC dice.

Additional Description and Examples

Example 1 includes subject matter (such as an electronic device) comprising a photonic integrated circuit (PIC) including at least one waveguide, an emitting lens disposed on the PIC to steer light emitted by the at least one waveguide in a direction substantially parallel to a first surface of the PIC, and an optical element disposed on the PIC and having a curved surface in a shape of a quarter cylinder that is configured to steer light emitted from the emitting lens in a direction substantially orthogonal to the first surface of the PIC.

In Example 2, the subject matter of Example 1, optionally includes the curved surface of the optical element having a mirror surface.

In Example 3, the subject matter of one or both of Examples 1 and 2 optionally includes an optical element that includes a lens including a support portion and a curved portion. The curved portion includes the curved surface and the support portion passes the emitted light from the emitting lens to the curved surface.

In Example 4, the subject matter of Example 3 optionally includes a PIC that includes a supporting substrate having a second surface intermediate to the first surface of the PIC and a bottom surface of the PIC opposite to the first surface, and a recess in the second surface. The support portion optionally includes an insertion portion and a stop portion, wherein the insertion portion is arranged in the recess and the stop portion is supported by the second surface.

In Example 5, the subject matter of one or any combination of Examples 1-4 optionally includes a space between the emitting lens and the optical element. The optical element includes a perpendicular surface perpendicular to the first surface of the PIC, and the optical element receives the emitted light from the emitting lens at the perpendicular surface.

In Example 6, the subject matter of Example 5 optionally includes a buried insulator layer positioned at a height intermediate to the first surface of the PIC and a bottom surface opposing the first surface of the PIC, and an emitting lens arranged between the first surface and the buried insulator layer.

In Example 7, the subject matter of one or any combination of Examples 1-6 optionally includes the first surface including bonding pads.

In Example 8, the subject matter of one or any combination of Examples 1-7 optionally includes multiple emitting lenses, a PIC that includes multiple optical signal sources to each provide an optical signal to a respective emitting lens of the multiple emitting lenses, and the curved surface of the optical element is configured to steer light emitted from the emitting lenses in a direction substantially orthogonal to the first surface of the PIC.

Example 9 includes subject matter (such as a method of forming an electronic device) or can optionally be combined with one or any combination of Examples 1-8 to include such subject matter, comprising forming a photonic integrated circuit (PIC) that includes at least one optical signal source, arranging an emitting lens on the PIC, the emitting lens positioned to steer light emitted by the optical signal source in a direction substantially parallel to a first surface of the PIC, and attaching an optical element on the PIC, the optical element having a curved surface in a shape of a quarter cylinder, wherein the curved surface is configured to steer light received from the emitting lens in a direction substantially orthogonal to the first surface of the PIC.

In Example 10, the subject matter of Example 9 optionally includes forming a second surface intermediate to the first surface of the PIC and a bottom surface of the PIC, forming a recess in the second surface, and positioning a support portion of the optical element in the recess.

In Example 11, the subject matter of Example 10 optionally includes arranging the emitting lens on the second surface of the PIC, and positioning the support portion of the optical element so that light received from the emitting lens passes through the support portion to a curved portion of the optical element.

In Example 12, the subject matter of one or both of Examples 10 and 11 optionally includes forming a buried insulator layer of the PIC, and the second surface is a surface of the buried insulator layer.

In Example 13, the subject matter of one or any combination of Examples 10-12 optionally includes disposing solder bumps on bonding pads on the first surface of the PIC, and attaching the first surface of the PIC to a glass substrate using the solder bumps, wherein the glass substrate includes a waveguide.

In Example 14, the subject matter of one or any combination of Examples 9-12 optionally includes arranging an emitting lens for each of multiple optical signal sources of the PIC, and a curved surface of the optical element configured to steer light received from the multiple emitting lens in a direction substantially orthogonal to the first surface of the PIC. The method further includes attaching the first surface of the PIC to a glass substrate having a waveguide for each of the multiple optical signal sources.

In Example 15, the subject matter of one or any combination of Examples 9-14 optionally includes attaching the first surface of the PIC to a glass substrate that includes a waveguide. The glass substrate optionally includes a curved mirror configured to focus the light received from the optical element onto the waveguide.

In Example 16, the subject matter of one or any combination of Examples 9-15 optionally includes attaching the first surface of the PIC to a glass substrate that includes a waveguide. The glass substrate including a mirror configured to steer the light received from the optical element onto the waveguide and a lens configured to focus the light received from the optical element onto the mirror.

Example 17 includes subject matter (such as an electronic device) or can optionally by combined with one or any combination of Examples 1-6 to include such subject matter, comprising a photonic integrated circuit (PIC) mounted on a glass substrate. The PIC includes at least one optical signal source, at least one emitting lens positioned to steer light emitted by the at least one optical signal source in a direction substantially parallel to a first surface of the PIC, and a first optical element having a curved surface in a shape of a quarter cylinder that is configured to steer light emitted from the at least one emitting lens in a direction substantially orthogonal to the first surface of the PIC and wherein the first surface of the PIC is attached to the top surface of the glass substrate. The glass substrate a second optical element configured to receive light from the PIC perpendicular to a top surface of the glass substrate and focus the received light on at least one waveguide that extends within the glass substrate in a direction parallel to the top surface of the glass substrate.

In Example 18, the subject matter of Example 17 optionally includes the second optical element being a curved mirror configured to steer the light received from the PIC onto the wave guide.

In Example 19, the subject matter of Example 17 optionally includes a second optical element including a lens on the glass substrate to reduce light received from the first optical element and a mirror configured to steer the light onto the waveguide.

In Example 20, the subject matter of one or any combination of Examples 17-19 optionally includes multiple optical signal sources, an emitting lens for each optical signal source, an optical element having a curved surface configured to steer light emitted from the emitting lenses in a direction substantially orthogonal to the first surface of the PIC to the top surface of the glass substrate, and a glass substrate that includes a waveguide for each optical signal source.

These non-limiting examples can be combined in any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An electronic device comprising:
a photonic integrated circuit (PIC) including at least one waveguide;
an emitting lens disposed on the PIC to emit light from the at least one waveguide in a direction substantially parallel to a first surface of the PIC;
an optical element disposed on the PIC and having a curved surface in a shape of a quarter cylinder that is configured to steer light emitted from the emitting lens in a direction substantially orthogonal to the first surface of the PIC; and
a glass substrate comprising a waveguide wherein the PIC is on the glass substrate and wherein light emitted from the optical element is directed toward the glass substrate.

2. The electronic device of claim 1, wherein the curved surface of the optical element includes a mirror surface.

3. The electronic device of claim 1:
wherein the optical element includes a lens including a support portion and a curved portion; and
wherein the curved portion includes the curved surface and the support portion passes the emitted light from the emitting lens to the curved surface.

4. The electronic device of claim 3,
wherein the PIC includes a supporting substrate having a second surface intermediate to the first surface of the PIC and a bottom surface of the PIC opposite to the first surface, and a recess in the second surface; and
wherein the support portion includes an insertion portion and a stop portion, wherein the insertion portion is arranged in the recess and the stop portion is supported by the second surface.

5. The electronic device of claim 1, including:
a space between the emitting lens and the optical element; and
wherein the optical element includes a perpendicular surface perpendicular to the first surface of the PIC, and the optical element receives the emitted light from the emitting lens at the perpendicular surface.

6. The electronic device of claim 5, including:
a buried insulator layer positioned at a height intermediate to the first surface of the PIC and a bottom surface opposing the first surface of the PIC; and
wherein the emitting lens is arranged between the first surface and the buried insulator layer.

7. The electronic device of claim 1, wherein the first surface includes bonding pads.

8. The electronic device of claim 1, including:
multiple emitting lenses;
wherein the PIC includes multiple optical signal sources to each provide an optical signal to a respective emitting lens of the multiple emitting lenses; and
wherein the curved surface of the optical element is configured to steer light emitted from the emitting lenses in a direction substantially orthogonal to the first surface of the PIC.

9. A method of forming an electronic device, the method comprising:
forming a photonic integrated circuit (PIC) that includes at least one waveguide;
arranging an emitting lens on the PIC, the emitting lens positioned to steer light emitted by the at least one waveguide in a direction substantially parallel to a first surface of the PIC;
attaching an optical element on the PIC, the optical element having a curved surface in a shape of a quarter cylinder, wherein the curved surface is configured to steer light received from the emitting lens in a direction substantially orthogonal to the first surface of the PIC; and
attaching the first surface of the PIC to a glass substrate wherein the glass substrate includes a waveguide.

10. The method of claim 9,
wherein the forming the PIC includes:
forming a second surface intermediate to the first surface of the PIC and a bottom surface of the PIC;
forming a recess in the second surface; and
wherein the attaching the optical element includes positioning a support portion of the optical element in the recess.

11. The method of claim 10,
wherein the arranging the emitting lens includes arranging the emitting lens on the second surface of the PIC; and
wherein the attaching the optical element includes positioning the support portion of the optical element so that light received from the emitting lens passes through the support portion to a curved portion of the optical element.

12. The method of claim 10, wherein the forming the PIC includes forming a buried insulator layer of the PIC, and the second surface is a surface of the buried insulator layer.

13. The method of claim 10, including:
disposing solder bumps on bonding pads on the first surface of the PIC; and
attaching the first surface of the PIC to the glass substrate using the solder bumps.

14. The method of claim 9,
wherein the arranging an emitting lens on the PIC includes arranging an emitting lens for each of multiple optical signal sources of the PIC, and the curved surface of the optical element is configured to steer light received from the multiple emitting lenses in a direction substantially orthogonal to the first surface of the PIC; and wherein the glass substrate includes a waveguide for each of the multiple optical signal sources.

15. The method of claim 9, wherein the glass substrate includes a curved mirror configured to focus the light received from the optical element onto the waveguide.

16. The method of claim 9, wherein the glass substrate includes:
 a mirror configured to steer the light received from the optical element onto the waveguide; and
 a lens configured to focus the light received from the optical element onto the mirror.

17. An electronic device comprising:
 a photonic integrated circuit (PIC) mounted on a glass substrate;
 wherein the PIC includes:
  at least one optical signal source;
  at least one emitting lens positioned to steer light emitted by the at least one optical signal source in a direction substantially parallel to a first surface of the PIC; and
  a first optical element having a curved surface in a shape of a quarter cylinder that is configured to steer light emitted from the at least one emitting lens in a direction substantially orthogonal to the first surface of the PIC and wherein the first surface of the PIC is attached to a surface of the glass substrate; and
 wherein the glass substrate includes:
  a second optical element configured to receive light from the PIC perpendicular to the surface of the glass substrate and focus received light on at least one waveguide that extends within the glass substrate in a direction parallel to a top surface of the glass substrate.

18. The electronic device of claim 17, wherein the second optical element is a curved mirror configured to steer the light received from the PIC onto the at least one wave guide.

19. The electronic device of claim 17, wherein the second optical element includes a lens on the glass substrate to reduce light received from the first optical element and a mirror configured to steer the light onto the at least one waveguide.

20. The electronic device of claim 17,
 wherein the at least one optical signal source includes multiple optical signal sources;
 wherein the at least one emitting lens includes an emitting lens for each optical signal source;
 wherein the curved surface of the optical element is configured to steer light emitted from the emitting lenses in a direction substantially orthogonal to the first surface of the PIC to the top surface of the glass substrate; and
 wherein the glass substrate includes a waveguide for each optical signal source.

* * * * *